United States Patent [19]
Gross

[11] 3,798,523
[45] Mar. 19, 1974

[54] SINGLE PHASE INDUCTION MOTOR BRAKE

[76] Inventor: Thomas A. O. Gross, P.O. Lincoln, Concord Rd., Lincoln, Mass. 02172

[22] Filed: Mar. 7, 1972

[21] Appl. No.: 232,482

[52] U.S. Cl............................ 318/212, 318/221 R
[51] Int. Cl............................................. H02p 3/20
[58] Field of Search......................... 318/209–212, 318/220, 221

[56] References Cited
UNITED STATES PATENTS

| | | |
|---|---|---|
| 3,504,255 | 3/1970 | L'Esperance...................... 318/212 |
| 3,233,158 | 2/1966 | Gilbert............................... 318/212 |
| 3,412,304 | 11/1968 | Baum et al...................... 318/212 X |
| 1,911,356 | 5/1933 | Eames................................ 318/212 |

*Primary Examiner*—Gene Z. Rubinson
*Attorney, Agent, or Firm*—Kenway & Jenney

[57] ABSTRACT

The capacitor in a single phase induction motor is used as a current limiting impedance in a DC braking circuit. The circuit includes the AC source, the capacitor, a rectifier and a field winding.

5 Claims, 2 Drawing Figures

3,798,523

SINGLE PHASE INDUCTION MOTOR BRAKE

BACKGROUND OF THE INVENTION

This invention relates to induction motors, and in particular to means for braking a running motor.

A common dangerous condition associated with tools powered by electric motors arises from the tendency of the tool and motor to continue to run by inertia, after the power has been shut off. A circular saw or rotary lawnmower thus running still presents the capability of severe physical injury should it come into contact with the body.

Systems have been devised for braking this rotation. One common expedient has been to energize the field windings of the stator with direct current, such that the eddy currents induced in the rotor generate a counter revolutionary torque. Numerous means for supplying DC to the field coils have been proposed including the use of storage batteries or rectifiers. All of them thus far devised require expensive and cumbersome auxiliary equipment.

Because the impedance of the field winding to DC is considerably less than it is to the AC normally employed to run the motor, the voltage of the applied DC must be considerably less than the AC running voltage. Braking systems that employ rectifiers to provide a braking DC therefore require means for reducing the applied voltage and so far as presently known these have included either a transformer or a large voltage dropping resistor. By way of example a fractional horsepower motor operating at 120 volts AC would be effectively braked by the application of DC at about 10 volts. Transformers or dropping resistors to achieve this voltage reduction have to be rather large and may also dissipate excessive heat.

BRIEF DESCRIPTION OF THE INVENTION

I have discovered that the means for achieving effective voltage reduction in connection with the provision of a rectified braking circuit for a single phase induction motor may be found within the motor itself. A single phase induction motor of the capacitor start type includes at least two sets of stator field windings, one of which is in circuit temporarily with a capacitor which provides a phase shift relative to the energization of the other field winding sufficient to provide a rotational field component. I have found that if this capacitor is arranged to be connected in series in the A.C. input circuit of a having a DC output circuit for energizing a field winding with DC, very nicely controlled braking takes place.

Accordingly in a simple embodiment of this invention there is provided, in addition to the normal running circuit of the motor, an auxiliary braking circuit by which the capacitor is switched into series with the power source, a rectifier and one or both field windings. With a capacitor start type induction motor a triple pole triple throw switch may be employed, with one set of poles connecting the running circuit, one set connecting the stop circuit, and the third being dead, representing the "off" position.

In a more sophisticated circuit the change from the running circuit to the stop circuit is effected by a multipole double throw solenoid switch. The power circuit to the motor is through this solenoid switch and also through a triggerable semiconductor current switching device which is triggered by actuation of a control relay having a relatively large capacitor across DC energized control relay coil.

The capacitor serves the purpose of delaying the closing of the control relay contacts and triggering of the switching device at the start so that power is not put to the running circuit until after actuation of the main solenoid. The condenser also provides a discharge current through the control relay coil sufficient to hold the control relay closed when the motor is to be stopped to permit conduction through the semiconductor switching device long enough for braking to occur. With this arrangement the semiconductor switching device relieves the solenoid switch from the burden of arc suppression, and delays deenergization of the brake circuit until after braking has been completed.

DESCRIPTION OF THE DRAWINGS

The preferred embodiments of the invention are described in detail below with reference to the accompanying drawings in which.

DETAILED DESCRIPTION OF THE INVENTION

Figure 2:
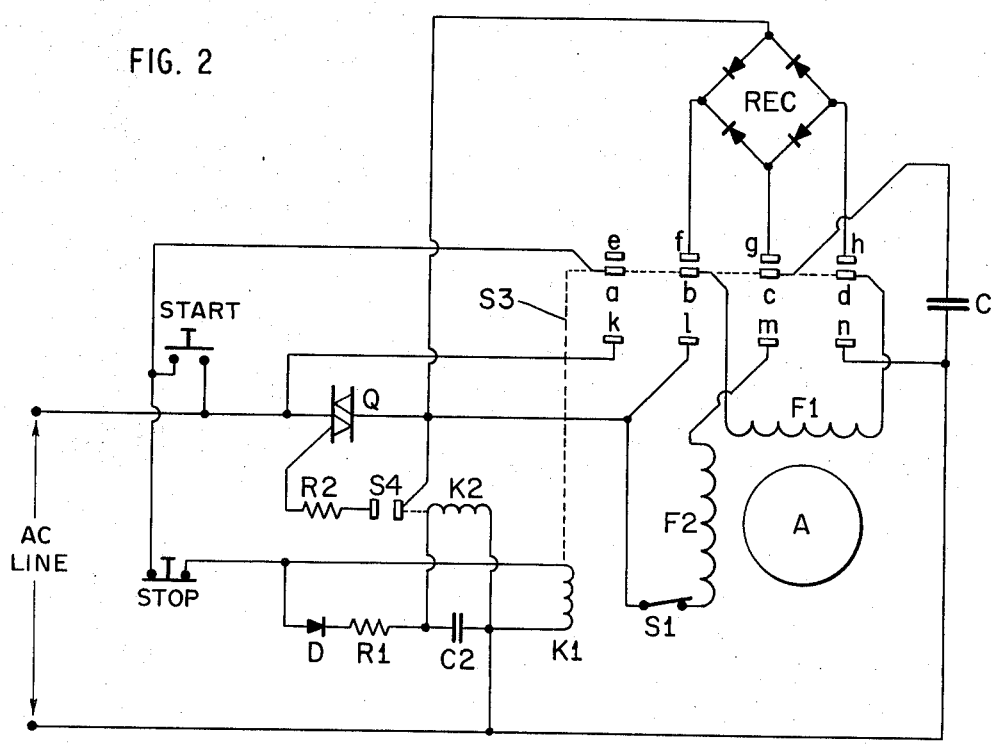
FIG. 2 is a schematic diagram of the same type motor as shown in FIG. 1 showing a more sophisticated embodiment.

Both embodiments shown in the drawings are adapted to a conventional single phase capacitor start induction motor which consists of a rotor A usually of the squirrel cage type and a pair of field windings F1 and F2, the latter of which is a starting winding in series with a starting condenser C through a centrifugal switch S1, normally closed when the rotor is stationary but open when the rotor achieves a certain speed. At start up, the fields in the windings F1 and F2 are out of phase by virtue of the capacitive component of the field in starting winding F2. This out of phase characteristic creates a rotational component in the overall field applied to the rotor and causes the latter to rotate. After a certain rotational speed has been reached the centrifugal switch S1 opens, thereby taking the starting winding F2 out of the circuit and leaving the motor running under the single phase field of the main winding F1.

The braking circuit of this invention consists of a rectifier REC preferably full wave, means to connect the AC input circuit in series with the starting capacitor C and to connect the DC output circuit to the main winding F1.

Figure 1:
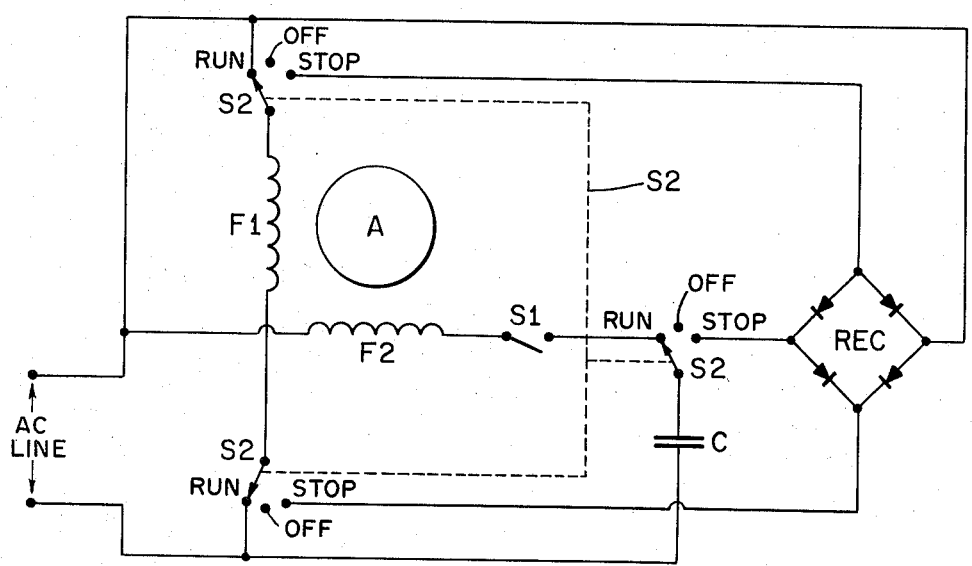
FIG. 1 is a schematic diagram of a single phase induction motor, capacitor start type, incorporating a simple embodiment of this invention.

In the embodiment illustrated in FIG. 1 the motor is shown in the running position with the centrifugal switch S1 open. Energization of the braking circuit is achieved by switching the control switch S2 to the "stop" position thereby switching the starting capacitor C into series with the AC input circuit of the rectifier REC and simultaneously connecting the main winding F1 across the DC output of the rectifier REC. This in effect places the main winding F1 in series with the DC output of the full wave rectifier REC and the starting capacitor C, in series with the AC input where it serves as a current limiting impedance.

In the embodiment illustrated in FIG. 2 the start and stop circuits are controlled by a four pole double throw solenoid switch S3 having four movable contacts a, b, c and d actuated by coil K1. In FIG. 2 the circuit is shown in the stop condition in which contacts $a, b, c$ and $d$ connect respectively with points $e, f, g$ and $h$ and the centrifugal switch S1 is closed. When coil K1 is energized the solenoid switch contacts $a, b, c$ and $d$ then connect respectively with the points $k, l, m$ and $n$.

The power circuit to the motor includes a solid state switching device Q which serves to delay the energization of the motor until after the solenoid switch S3 has been actuated; this device is typically a Triac and may be described as a triggerable semiconductive AC switching device, which is nonconducting until a triggering voltage is applied to the gate. The gate circuit is through a resistor R1 and a relay switch S4, which is normally open until actuated by relay coil K2. The relay coil K2 is energized by direct current through a diode D and a resistor R1, but is shunted by a holding capacitor C2 which serves initially to short circuit coil K thereby delaying its energization.

In the embodiment illustrated in FIG. 2 the system is in "stop" condition with the top and bottom connections to the full way rectifier REC across the AC line through the $c-g$ contact of the solenoid switch S3 and the starting capacitor C. However, as the solid state switching device Q is nonconducting because switch S4 in the gate circuit is open and no current flows. When the "start" button is pressed a circuit through the "stop" button to the coil K1 of the switch S3 is established and contacts are made at $a-k$, $b-1$, $c-m$ and $d-n$. At $b-1$ and $d-n$ the main field F1 is placed across the line and at $c-m$ and $b-l$ the starting winding F2 is placed across the line in series with the starting capacitor C. At the same time a holding circuit for coil K1 is established through contacts at a-k and the normally closed "stop" button and a circuit to diode D, resistor R1 and holding capacitor C2 is established causing a charge to build up on C2 which gradually initiates flow of current through the relay coil K2. This build-up provides a delay in the closing of relay switch S4 and effects a delay in the triggering of the solid state switching device Q until relay contacts S4 close. Thereafter S4 remains closed to provide continuous triggering potential to the gate.

After running speed has been attained the centrifugal switch S1 opens, taking the starting windings F2 out of the circuit to leave the motor running under the main winding F1. The motor continues to run until the "stop" button is pressed at which time the circuit to coil K1 is opened and contacts $b-f$, $c-g$, and $d-h$ are established, thereby placing AC input circuit of the full wave rectifier REC in series with the starting capacitor C through contacts $c-g$, and placing the running coil F1 in series with DC output circuit of the full wave rectifier REC through contacts $b-f$ and $d-h$. The charged holding condensor C2 discharges through relay coil K2 keeping it energized and switch S4 closed for a few seconds, during which braking takes place. When the holding condensor C2 becomes discharged, the switch S4 opens the gate circuit and causes an open circuit condition in the solid state switching device Q. The motor is now in the normal "off" condition.

In a typical installation of the braking circuit of this invention in a 1½-horsepower 120 Volt 60 Hz single phase induction motor, the following commercial components were employed in the embodiment illustrated in FIG. 2.

| | |
|---|---|
| S-3 | Arrow Hart FPR-44-UN |
| K-2, S-4 | Magnecraft W102 MX-5 |
| C-2 | 50 V. Electrolytic 40μ Fd. |
| REC | Motorola MDA 980 |
| R-1 | 3,900 ohm 1 Watt |
| R-2 | 100 ohm ½ Watt |
| Q | Triac GE SC250B |
| D | 1N4004 Diode |

In this installation braking to standstill occurred in about the same time as the starting time to full speed running. Under no load, each occurred in about 200 milliseconds.

Although this invention has been described with specific reference to the preferred embodiments, it is contemplated that modifications will readily occur to those familiar with the principles herein set forth and that such may be made without departing from the scope of this invention. Specifically the semiconductor switch Q could be replaced by other auxiliary power switching devices, such as a power relay. In fact relay S4, if of sufficient capacity, could be connected in the line in place of the semiconductor switch Q. Also other rectifier circuits than the bridge illustrated in FIG. 2 can be employed including voltage multiplying configurations well known to the art.

It is also contemplated that the starting condenser C1 can be made up of two or more condensers, one or more being connected into the starting circuit and one or more into the braking circuit. In each case either series or parallel connections can be utilized to provide for starting and braking circuits of different characteristics. For instance, two can be connected in series for starting and in parallel for braking or vice versa.

Having thus described my invention and described in detail preferred embodiments thereof, I claim and desire to secure by Letters Patent:

1. In an AC energized capacitor start induction motor having start and run windings, a capacitor, means adapted to connect said capacitor in series with said start windings during starting of said motor, a circuit for braking said motor to stop the same comprising a rectifier, said run windings and said capacitor, and means for disconnecting said capacitor from the start windings and connecting said capacitor into said braking circuit, the connection of said capacitor to said rectifier providing a current limiting impedance, and means to connect said run windings to said rectifier thereby to supply DC to said run windings which commence braking action on said motor.

2. The braking circuit as defined in claim 1 wherein the said rectifier is a full-wave rectifier.

3. The braking circuit as defined in claim 1 wherein the rectifier is a diode connected in parallel with said run windings.

4. The braking circuit as defined in claim 1 wherein the rectifier is connected to both the start and run windings during braking.

5. The braking circuit defined by claim 1 wherein said capacitor comprises a plurality of condensers, with means to connect the same in series or in parallel.

* * * * *

UNITED STATES PATENT OFFICE
CERTIFICATE OF CORRECTION

Patent No. 3,798,523　　　　　　　　Dated March 19, 1974

Inventor(s) Thomas A. O. Gross

It is certified that error appears in the above-identified patent and that said Letters Patent are hereby corrected as shown below:

The inventor's address is incorrect with regard to the zip code. Change "02172" to --01773--.
Column 1, line 50, after "a" (first occurrence), insert --rectifier--.
Column 3, line 49, after "placing", insert --the--; and on line 52, after "with", insert --the--.

Signed and sealed this 24th day of September 1974.

(SEAL)
Attest:

McCOY M. GIBSON JR.　　　　　　　　C. MARSHALL DANN
Attesting Officer　　　　　　　　　Commissioner of Patents